United States Patent [19]

Harris et al.

[11] Patent Number: 4,484,727
[45] Date of Patent: Nov. 27, 1984

[54] FLUID CONTROL VALVES

[75] Inventors: Kenneth M. Harris, London; Derek Williams; Derek W. Tomsett, both of Hertford, all of England

[73] Assignee: Lucas Industries Public Limited Company, Birmingham, England

[21] Appl. No.: 439,816

[22] Filed: Nov. 8, 1982

[30] Foreign Application Priority Data

Nov. 11, 1981 [GB] United Kingdom ............... 8134042

[51] Int. Cl.³ .............................................. F16K 31/06
[52] U.S. Cl. ..................................... 251/77; 251/129; 251/141; 137/DIG. 4
[58] Field of Search ................... 251/77, 80, 129, 141; 137/DIG. 4

[56] References Cited

U.S. PATENT DOCUMENTS

| | | | |
|---|---|---|---|
| 1,383,432 | 7/1921 | Simon | 251/129 X |
| 2,147,945 | 2/1939 | Hann et al. | 251/129 |
| 2,365,752 | 12/1944 | Edwards | 137/DIG. 4 |
| 2,827,923 | 3/1958 | Sadler | 251/77 X |

Primary Examiner—Arnold Rosenthal

[57] ABSTRACT

A fluid control valve includes a valve member in the form of a sleeve which is shaped to co-operate with a seating defined about a bore in a valve body. The sleeve has a rod extending therein, the rod being coupled to an armature of an electromagnetic device including a stator having a winding. A resilient bush is located between the rod and the sleeve to allow limited further movement of the armature after the sleeve has engaged the seating.

4 Claims, 1 Drawing Figure

U.S. Patent
Nov. 27, 1984
4,484,727
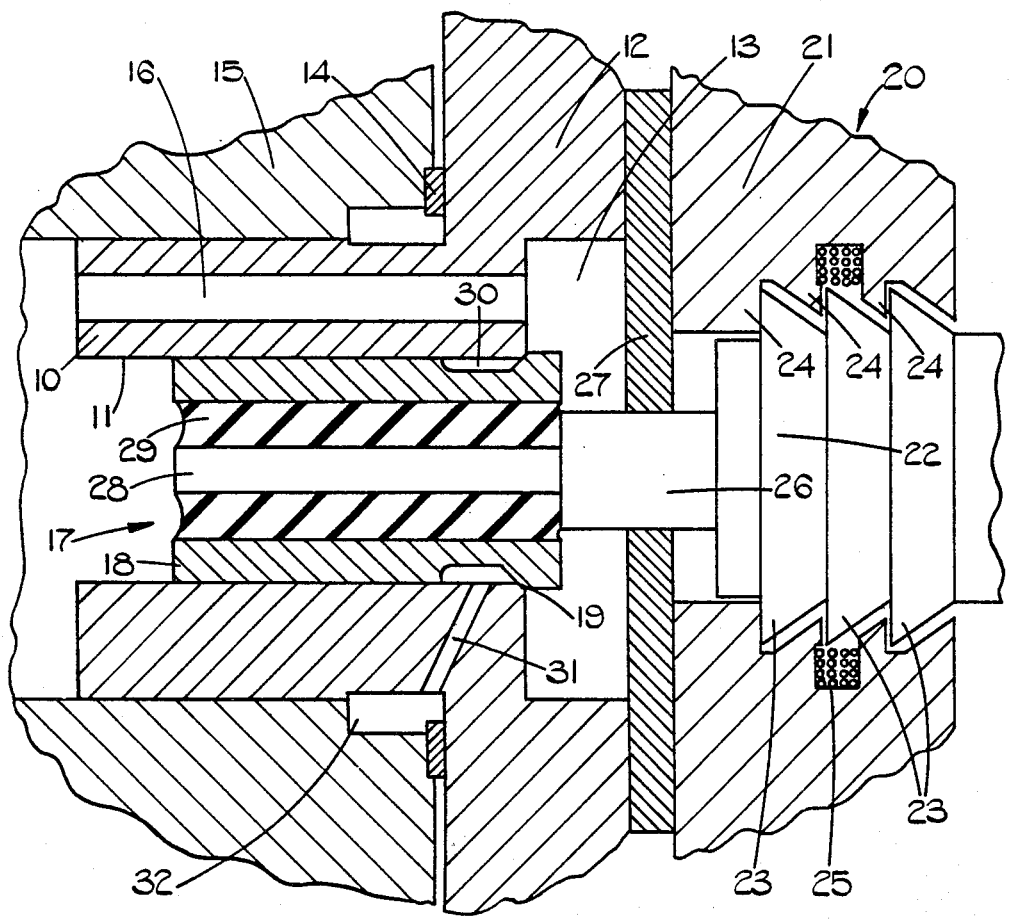

FLUID CONTROL VALVES

This invention relates to an electromagnetically operable fluid control valve which includes a valve member shaped to co-operate with a seating and an electomagnetic device including an armature and a stator, the armature being operatively connected to the valve member.

In the case where the device is energised to close the valve member the maximum force which can be exerted by the electromagnetic device occurs when the air gap or gaps between the armature and the stator is/are zero. When the valve is intended to control fluid at high pressure it is essential that the seating area should be as small as possible and that the force acting to urge the valve member into contact with the seating should be as large as possible. It is not practical to arrange that contact of the valve member with the seating and the armature with the stator occur at exactly the same time during valve closure even if some form of adjustment is provided.

The valve member may be spring loaded to the closed position by means of a spring acting upon the armature. For a valve intended to control the flow of fluid at high pressure the spring loading must be high and in this case a stop for the armature is provided which halts the movement of the armature. Again it is not practical to arrange that the armature contacts its stop at the same time as the valve member contacts its seating.

The object of the invention is to provide a fluid control valve in a simple and convenient form.

According to the invention in a fluid control valve of the kind specified said valve member is in the form of a sleeve into which extends a rod which forms an extension of or is operatively connected to the armature, and a resilient bush is located between the rod and the interior surface of the sleeve, said bush forming a stiff spring between the armature and the valve member, the valve member being arranged to contact the seating slightly before the contact of the armature with the stator or with a stop takes place.

An example of a fluid control valve in accordance with the invention will now be described with reference to the accompanying drawing which is a sectional side elevation of the valve together with part of the electromagnetic device.

Referring to the drawing the valve comprises a cylindrical valve body 10 in which is defined a bore 11. At one end of the body there is provided a flange 12 which has a recess 13 opening from the bore 11. The flange 12 is held in sealing engagement utilizing a washer 14, with a supporting body 15. A passage 16 extends between the recess 13 and the opposite end of the valve body and slidable within the bore 11 is a valve member which is generally indicated at 17.

The valve member is in the form of a sleeve 18 and it extends into the recess 13. At this end the sleeve has a slightly larger diameter to define the equivalent of a valve head which is shaped to co-operate with a seating 19 which is defined at the junction of the bore 11 with the base wall of the recess 13.

Also provided is an electromagnetic device 20 which comprises a stator 21 and an armature 22. The armature defines a plurality of circumferentially extending pole pieces 23 and the stator defines complementary pole pieces 24. Between the pole pieces 24 are defined grooves 25 only one of which is shown in the drawing. The grooves accommodate windings which can be supplied with electric current. In the case where more than one groove is provided adjacent grooves have the windings extending in the opposite direction so that when the windings are energised adjacent pole pieces 24 assume opposite magnetic polarity and a force is applied to the armature tending to move the pole pieces 23 towards the pole pieces 24. The device is shown in the energised condition in the drawing.

The armature carries an extension 26 which extends through a spacer member 27 interposed between the stator and the flange 12. The extension 26 has a reduced portion which constitutes a rod 28 which extends within the sleeve 18. Interposed between the rod 28 and the interior surface of the sleeve 18 is a resilient bush 29 which conveniently is bonded to the surfaces of the rod and the sleeve. The bush may be formed from rubber or a synthetic resin material. It will be noted that the cross-section or diameter of the extension 26 is only slightly smaller than the internal cross-section or diameter of the sleeve 18. The bush 29 constitutes a stiff spring between the armature and the bush.

The sleeve 18 is provided with a circumferential groove 30 in its outer peripheral surface, the groove lying adjacent the slightly enlarged portion thereof. Moreover, the groove 30 communicates by way of a passage 31 in the valve body, with a circumferential recess 32 defined in the supporting body 15. This recess communicates with a high pressure source of liquid. In order to open the valve the winding in the groove 25 is de-energised and the armature may be moved by the action of a spring not shown or it may be moved by the action of a further winding which may be located on a further stator housed about the armature. When so moved the valve head is moved away from the seating 19 to permit liquid under pressure to flow through the passage 31 into the recess 13 and out of the recess by way of the passage 16. When the winding is energised to close the valve it must do so against the action of the liquid under pressure acting upon the small differential area of the valve member. This area is kept as small as possible and it is arranged that during movement of the valve member towards the closed position the head portion of the valve member engages the seating 19 before the movement of the armature is halted by abutment of for example the pole pieces of the armature and stator. The thickness of the spacer member 27 is chosen so that this always occurs however, the spacer 27 should not be so thin that there is appreciable movement required by the armature before the pole pieces abut. The slight relative movement of the rod and sleeve which takes place after the head portion of the valve member has contacted the seating and before the pole faces of the armature and stator contact each other, is accommodated by the resilient bush 29. It will be noted that only one of the pole pieces 23 is shown in contact with the corresponding pole piece 24. This reduces the possibility of the rotor "sticking" by virtue of residual magnetic forces, when the winding is de-energised.

The electromagnetic device may be arranged to function in the opposite manner to that described and be energised to open the valve, the armature of the device being biased by a strong spring in the direction to close the valve. In this case a stop would be provided to halt the movement of the armature under the action of the spring. The valve member would be arranged to contact its seating just before the armature contacted its stop, the slight relative movement of the armature and the valve member being accommodated by the bush.

We claim:

1. An electromagnetically operable fluid control valve including a valve member and a seating, the valve member being shaped to co-operate with the seating and an electromagnetic device including an armature and a stator, said valve member being in the form of a sleeve, a rod operatively connected to the armature, said rod extending into said sleeve, a resilient bush located between the rod and the interior surface of the sleeve, said bush forming a stiff spring between the armature and the valve member, and stop means operable to limit the movement of the armature, the valve member being arranged to contact the seating slightly before the contact of the armature with the stop means takes place.

2. A valve according to claim 1, in which said rod extends from an extension of the armature, said extension being of a size slightly smaller in cross-section than the cross-section of the aperture in the sleeve.

3. A valve according to claim 2 in which said bush is bonded to the surface of the rod and the internal surface of the sleeve.

4. A valve according to claim 1 in which said stop means is defined by part of the stator.

* * * * *